Oct. 13, 1959  F. H. SHEPARD, JR  2,908,864
FREQUENCY METER
Filed June 19, 1952  2 Sheets—Sheet 1

INVENTOR.
FRANCIS H. SHEPARD Jr.
BY Henry L. Shevier
ATTORNEY

Oct. 13, 1959 F. H. SHEPARD, JR 2,908,864
FREQUENCY METER

Filed June 19, 1952 2 Sheets-Sheet 2

INVENTOR.
FRANCIS H. SHEPARD JR.
BY
ATTORNEY

United States Patent Office 2,908,864
Patented Oct. 13, 1959

2,908,864

FREQUENCY METER

Francis H. Shepard, Jr., Madison, N.J.

Application June 19, 1952, Serial No. 294,513

4 Claims. (Cl. 324—78)

My invention relates to frequency meters and more particularly to a meter for measuring the frequency of any alternating signal within extremely accurate limits.

Frequency meters of the prior art vary in accuracy in accordance with the current of the input signal being measured and variations in readings, depending on the voltage of the input signal, are experienced.

One object of my invention is to provide a frequency meter which will measure the frequency accurately independent of the voltage or current of the signal being measured.

Another object of my invention is to provide a simple frequency meter which will accurately measure the frequency of any signal independent of its voltage in a simple, convenient and inexpensive manner.

Other and further objects of my invention will appear from the following description.

In general my invention contemplates the provision of a saturable core reactor having wound thereon a primary winding and a secondary winding whereby the input signal is adapted to be converted into a series of voltage pulses. I provide means for ensuring that the areas of the voltage pulses are constant so that they will be proportional to the saturation limit of the core independent of the current. The area under the voltage-time curve is purely a function of the change in flux level. According to my invention the flux level is maintained at a constant point after saturation of the core by compensating for variations in flux level after saturation. The transformer output is represented by a series of voltage pulses. These pulses are integrated and rectified and the rectified output is read on a galvanometer such as an ammeter calibrated as a function of frequency. The accuracy of my frequency meter depends on the accuracy of the area of the voltage pulses. I am enabled by my invention to read frequency accurately to within .005% or better depending on the accuracy of the ammeter. I maintain the uniformity of the area under the voltage-time curves of the voltage pulses by balancing the air core effects of a pair of transformers so that the area of the pulses will be proportional to the saturation limit of the core independent of the current flowing through the primary windings of the transformers. I accomplish this by providing an auxiliary primary winding in series with the main primary winding of the transformer and a second auxiliary winding in series with the main secondary winding of the transformer. The auxiliary windings are coupled primarily by an air core and are oppositely disposed so that the residual flux generated by the current flowing through the primary winding of the transformer after saturation will, owing to the air coupling effect, induce a potential in the secondary auxiliary winding equal and opposite to that induced in the secondary main winding. In other words, since the air core effect cannot be conveniently eliminated I compensate for it. The flux after saturation will be a function of the current and since this is compensated for I achieve the result I desire of having the area of the pulses of voltage constant and proportional only to the saturation limit of the saturable core and completely independent of the current flowing through the primary winding.

In the accompanying drawings which form part of the instant specification and which are to be read in conjunction therewith and in which like reference numerals are used to indicate like parts in the various views.

Figure 1:
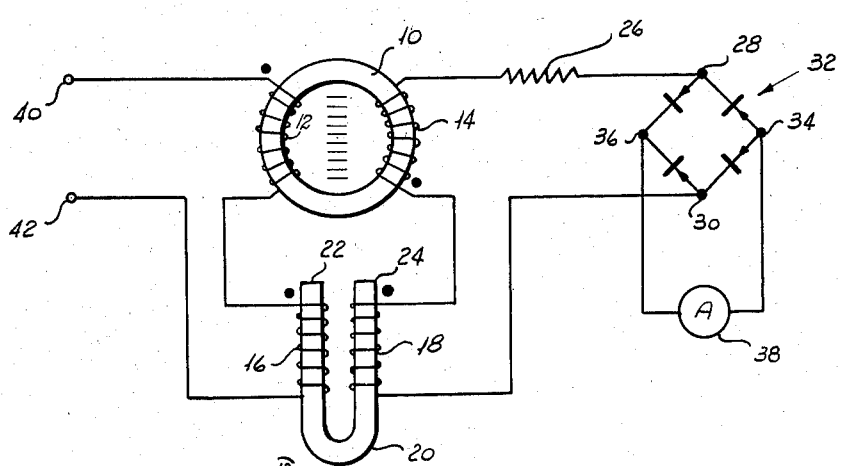
Figure 1 is a diagrammatic view showing a frequency meter containing one embodiment of my invention.

More particularly, referring now to Figure 1, a saturable core 10 is provided with a winding 12 and a secondary winding 14. The primary winding 12 is connected in series with an auxiliary winding 16 which is inductively coupled to an auxiliary winding 18 which is connected in series with a secondary winding 14. A small movable core 20 of magnetizable metal has arms 22 and 24 extending through the windings 16 and 18 respectively. The arms 22 and 24 may be moved upwardly and downwardly into and out of the windings 16 and 18 to vary the inductive coupling and therefore the voltage output of the auxiliary windings. The winding 18 is oppositely wound from winding 14 so that the voltage induced in winding 18 will be of opposite polarity from the voltage induced in winding 14 under the influence of a current flowing through the primary winding 12 and the primary auxiliary winding 16 in series. The output of the secondary windings is impressed through a resistor 26 upon the terminals 28 and 30 of a rectifier indicated generally by the reference numeral 32. The output of the rectifier is taken from terminals 34 and 36 and impressed across a galvanometer such as the ammeter 38. The ammeter may be calibrated as a function of frequency. The input signal is impressed across terminals 40 and 42.

Figure 2:
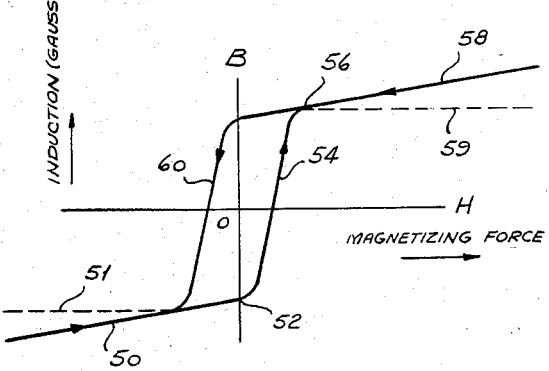
Figure 2 is a curve of the flux in the secondary plotted against magnetizing force which can be considered as a function of the input current.

Referring now to Figure 2, let us consider that the input signal is on the negative part of its cycle and going toward positive polarity. The portion of the curve 50 shows that the flux is decreasing as the current decreases. The slope of the portion of the curve 50 is due to the air core effect of the transformer. While the core is saturated the only change in flux is due to this air core effect and the current flowing through the primary winding. As the input current changes polarity the core becomes unsaturated in the negative direction and begins to become magnetized in the positive direction. There is a lag between the change in polarity of the input signal and the change in the direction of magnetization. This phenomenon is well understood in the art and is known as hysteresis. At point 52 on the curve the polarity of the input signal has changed. It will be observed that there is a sharp change in flux represented by the portion of the curve 54 which continues until point 56 at which saturation of the core in the positive direction is reached. That portion of the curve 58 again represents an increase in flux due to the air core effect. In the reverse direction the same procedure takes place except that the portion of the return curve 60 is displaced to the left of the axis OB due to hysteresis by adjusting the core 20 I can move the curve 50 from its full line position to its dotted line position 51, and the portion of the curve 58 from its full line position to its dotted line position 59. In this manner the areas under the voltage pulses which are generated in the secondary windings will be proportional to the saturation limit of the core 10 and be independent of the current or voltage of the input signal. It will be observed that I am enabled to measure frequency independent of the particular frequency being measured. Owing to the fact that in the devices of the prior art there was a variation depending upon the current or voltage of the input signal, a variation in the frequency measurement is experienced. At a lower voltage the devices of the prior art tend to underread to indicate a lower frequency. At higher voltages the devices of the prior art tend to overread to indicate higher frequencies.

Figure 3:
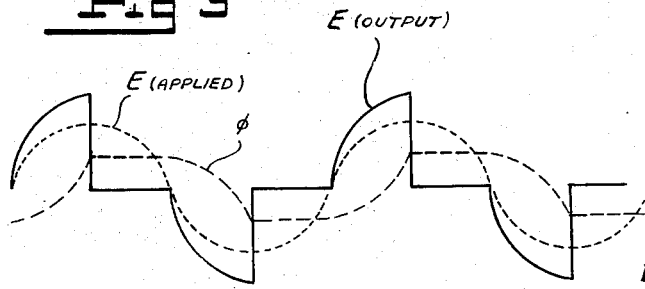
Figure 3 is a series of curves showing the phase relationships between the applied voltage, the flux generated and the voltage across the output of the composite secondary winding.

Referring now to Figure 3, the phase relationships between the applied voltage, the flux generated and the voltage across the output of the composite secondary winding are shown. It will be observed that as the applied current changes polarity there is a lag in the change in flux due to hysteresis. We started with the core being saturated in one direction. The magnetizing force acting in the opposite direction unsaturates the core as it approaches its peak in the opposite direction. There is a change in flux to saturation in the other direction as a function of input current. During the time that there is no flux change there is no voltage being induced across the composite secondary winding, as can be seen by the output voltage curve of Figure 3. As the flux increases there is induced a corresponding voltage in the composite secondary. This voltage reaches its peak upon saturation in the opposite direction and is a function of the rate of change of flux and of course the number of turns in the secondary windings which cut the lines of force incident to the flux change. After saturation is reached in the opposite direction the voltage drops to zero because of the compensating auxiliary winding and remains at this level until the flux shifts in the opposite direction, as can readily be seen by reference to Figure 3. The voltage pulses are integrated by the resistor 26. In this manner the total output current will be proportional to the average area of the voltage pulses. Since we are interested in total integrated current which will be the function of frequency we may advantageously use a rectifier together with a direct current galvanometer. In Figure 1 we have shown the use of a rectifier assembly employing asymmetric electrical conductors such as one made with copper oxide or selenium rectifier cells. Any appropriate rectifier can be used. If an electrostatic galvanometer is employed it performs the rectifying function inherent in its construction. It will be readily appreciated that if the frequency is high a large number of pulses will be generated in a given period of time and that the average output current will, therefore, be proportionately higher. Conversely if the frequency is low the average output current measured by the ammeter 38 will be low. By proper calibration of the ammeter 38 the frequency can be read to within very close limits. By means of my invention I have been able to read frequency with an accuracy of better than .005% with a self-balancing potentiometer.

Figure 4:
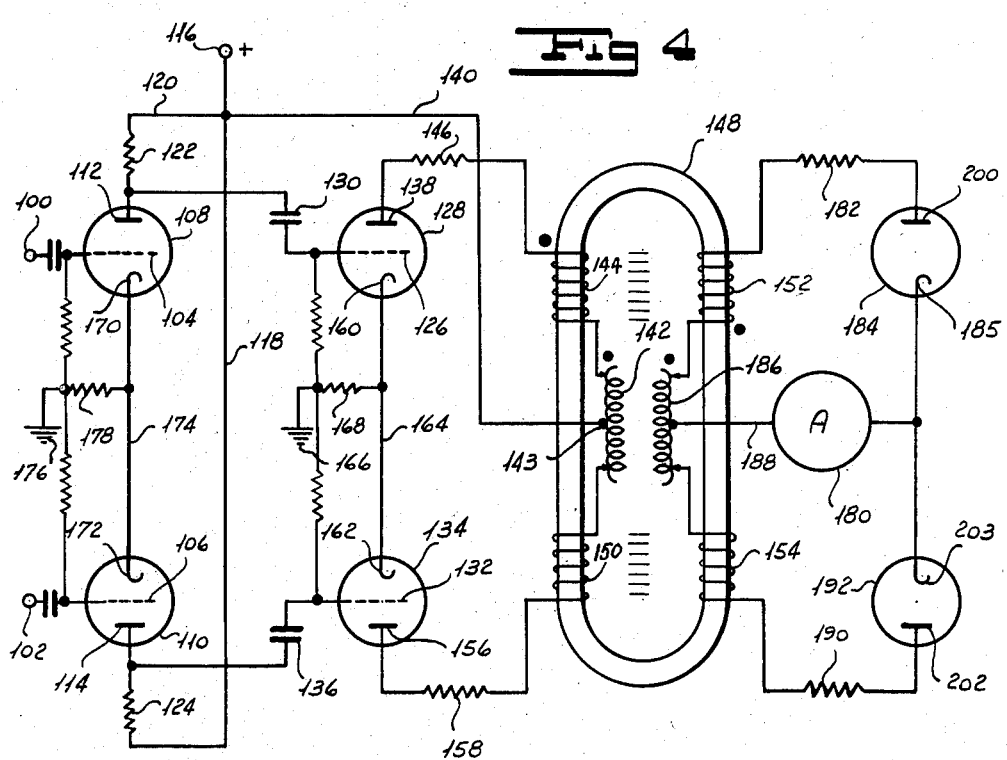
Figure 4 is a diagrammatic view showing a frequency meter constructed in accordance with another embodiment of my invention.

Referring now to Figure 4, I have shown another embodiment of my invention. The input signal comprising the frequency to be measured is led to terminals 100 and 102 which are connected to respective grids 104 and 106 of thermionic tubes 108 and 110. The plate 112 of the tube 108 and the plate or anode 114 of the tube 110 are connected to a source of positive potential represented by the terminal 116 through conductors 118 and 120. It will be observed that conductor 120 leading to anode 112 has interposed therein a resistor 122 and that conductor 118 has interposed therein a plate resistor 124. The plate 112 is connected to the grid 126 of thermionic tube 128 through a capacitor 130 which isolates the grid 126 from the plate potential. Similarly, the grid 132 of the thermionic tube 134 is connected to the plate 114 of the tube 110 through a capacitor 136. The plate 138 of the tube 128 is connected to the positive potential 116 through conductor 140, the upper half of auxiliary winding 142, a primary winding 144 and a resistor 146. The primary winding 144 is disposed about a core 148 upon which are wound primary winding 150 and secondary windings 152 and 154.

The positive potential from source 116 is impressed upon the plate 156 of the tube 134 through conductor 140, the lower half of the auxiliary winding 142, the primary winding 150 and the resistor 158. The cathode 160 of the tube 128 and the cathode 162 of the tube 134 are connected by conductor 164 to ground 166 through a resistor 168 which controls the flow of current through the plate circuits of tubes 128 and 134. It will be seen that with no signal upon the grids 126 and 132 current will flow through both windings 144 and 150 in opposite directions. Since the windings 144 and 150 are equal, the effect of this current flow is to neutralize the inductance of both primary windings. In a similar manner the inductance of the upper half and the lower half of the auxiliary winding 142 is neutralized since the conductor 140 joins the auxiliary winding 142 at point 143 at which the inductance of the upper half compensates the inductance of the lower half of winding 142. Both the upper and lower halves of the winding 142 can be adjusted to balance the inductance to zero when no signal is impressed on either grid 126 or 132.

The cathodes 170 and 172 of the tubes 108 and 110 are connected by conductor 174 to ground 176 by a current-limiting resistor 178.

The secondary winding 152 is connected across the ammeter 180 through integrating resistor 182 and the plate to cathode circuit of a diode 184. The secondary auxiliary coil 186 is connected at its midpoint by conductor 188 to the other side of the ammeter. In a similar manner, the lower secondary coil 154 is connected across the ammeter 180. One side of the connecting circuit comprises the integrating resistor 190 and the plate to cathode circuit of a diode 192. The other side of the connecting circuit comprises the lower half of the secondary auxiliary winding 186.

Let us now consider the operation of my frequency meter as shown in Figure 4. An incoming signal is impressed across the terminals 100 and 102. Let us assume that the polarity of this signal is positive on grid 104. There will be an increase in current from the plate to cathode owing to the positive potential on the grid 104. The IR drop across the resistor 122 will drive the grid 126 of the thermionic tube 128 negative blocking the current flow through the primary winding 144 and its auxiliary winding 142. When this occurs the current flowing through winding 150 and its auxiliary winding will induce a flux in the core 148. This flux will generate a voltage in the serially connected windings 152, 186 and 154. The polarity of this voltage will depend on the direction of the winding 150. Let us assume that when winding 150 is energized the lower end of winding 154 is positive. The upper end of winding 152 will, of course, be negative. The cathode 185 of the tube 184 and the cathode 203 of the tube 192 are connected to the midpoint of winding 186 through the ammeter 180 and the conductor 188. The diode 184, therefore, will not conduct when the plate is negative with respect to the cathode 185. The diode 192, however, will conduct since its plate 202 is positive with respect to cathode 203 when the winding 150 is energized. When the input current reverses, an analogous operation takes place. This is the condition indicated by the polarity markings of Figure 4. The tube 110 conducts when its grid 106 is positive. The IR drop across the anode resistor 124 will drive the grid 132 negative and block the flow of current through winding 150. The flow of current through winding 144 will magnetize the core in the opposite direction and diode 184 will now conduct while diode 192 will not. On each reversal of voltage, however, current will flow through the ammeter 180. This current, of course, is the result of the voltage integrated by respective resistors 182 and 190 for each half of the cycle. The ammeter is calibrated in frequency and an accurate reading can be obtained of the frequency of the incoming signal.

Figure 5:
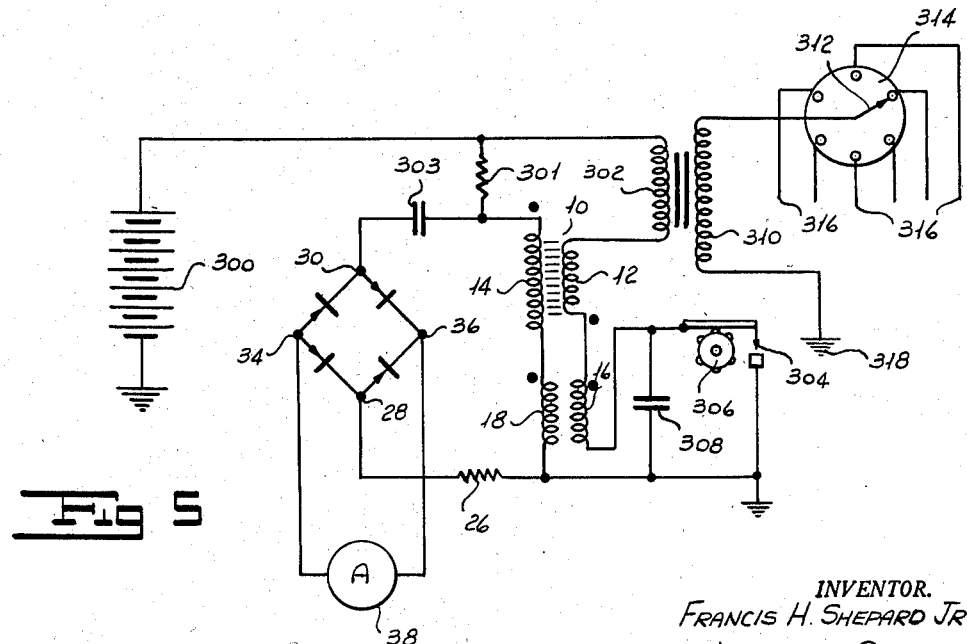
Figure 5 is a diagrammatic view showing my frequency meter employed as a tachometer to measure the speed of rotation of the crankshaft of an internal combustion engine.

Referring now to Figure 5, I have shown my frequency meter used as a tachometer to measure the speed of an internal combustion engine having an ignition system. The ignition system is conventional and comprises a battery 300 which is connected across the primary winding 302 of the ignition transformer, the primary winding 12 of my frequency meter, the auxiliary primary winding 16 of my frequency meter and a make-and-break contact 304 in series. The make-and-break contact 304 is operated by a cam 306, as is well understood in the art, and is paralleled by a capacitor 308 to reduce sparking when the circuit is broken. The secondary main winding 14 and the auxiliary secondary winding 18 are connected across terminals 28 and 30 of a rectifier through an integrating resistor 26. A continuous bias current is passed through the secondary winding 14 by placing it across the battery 300 by means of a resistor 301. The winding 14 is so wound that it will magnetize the core 10 in a direction opposite to that produced by current flowing through coil 12. The other terminals 34 and 36 of the rectifier are connected across an ammeter 38. One end of the secondary winding 310 of the ignition system is connected to a distributor arm 312 of the distributor 314 having conductors 316 leading to the spark plugs. The other end of the secondary winding 310 is connected to ground 318.

In operation of my tachometer current normally flows through the secondary winding 14 in one direction due to the current flowing from battery 300 through the resistor 301 adequate to saturate core 10 when the current through winding 12 is interrupted. The capacitor 303 isolates the rectifier from the battery voltage. The cam 306 is driven in synchronism with the distributor arm 312, as is well known in the art. The function of the cam is to close the contact 304 for a sufficient length of time to build up a flow of current through the primary winding 302 of the ignition system and then suddenly interrupt the primary circuit, thus inducing a high voltage in the secondary winding 310. While the current is building up in coil 12 it flows in the direction tending to saturate the core 10 oppositely from that under the current through resistor 301. When the circuit through primary winding 12 is suddenly interrupted along with the interruption of the circuit through primary winding 302 which is in series with it, the current is quickly reduced to zero permitting saturation of the core 10 in the opposite direction by current through winding 14, as was described in the operation of the embodiment in Figure 1. The auxiliary windings 16 and 18 are balanced to eliminate the air coupling effect, as has been hereinabove pointed out. In this manner every time the circuit is made and broken two voltage pulses are generated. One pulse is created by the current through winding 12 and the other pulse is created by current through winding 14 following the interruption of the circuit through the primary winding. These voltage pulses will, of course, extend in opposite directions as shown in Figure 3. The ammeter 38 in Figure 5, however, instead of being calibrated in frequency is calibrated to measure the speed of revolution of the crankshaft of the internal combustion engine. In this manner the ammeter 38 will measure engine speed. It is to be understood that ammeter 38 may be calibrated in any other suitable manner. If, for example, the internal combustion engine is used to drive an automotive vehicle the ammeter 38 can be calibrated to show speed for any given gear ratio. A plurality of scales, for example, can be used on the ammeter 38 to show the equivalent vehicle speed for each gear ratio. Inasmuch as my frequency meter is independent of voltage or frequency or current of the incoming signal great accuracy in measuring frequency or any function of frequency is achieved.

It will be seen that I have accomplished the objects of my invention. I have provided a frequency meter which will not vary in its measurement of frequency in accordance with the current, the voltage or the frequency of an input signal. I have provided a frequency meter which is simple in construction and accurate in its operation over a wide frequency range. The range of a particular instrument is limited only by the necessity that the core be driven to saturation by the input signal current. In those cases where the current is not sufficient to do this it is understood, of course, as is well known to the art, that an amplifier can be used between the incoming signal and the signal impressed across the primary of my frequency meter.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is therefore to be understood that my invention is not to be limited to the specific details shown and described.

Having thus described my invention, what I claim is:

1. In a frequency meter a saturable core, a primary winding, a rectifier having input and output terminals, a circuit including a secondary winding and an integrating impedance connected across the rectifier input terminals in series, said primary and secondary windings being disposed about the saturable core, bias current means for saturating the core in one direction, means for passing current through the primary winding to saturate the core in a direction opposite to the magnetization by the biasing current, means for interrupting the current flowing through the primary winding to permit the bias current to reverse the saturation of the core, and a galvanometer calibrated as a function of frequency connected across the output terminals of the rectifier.

2. A frequency meter as in claim 1 in which said bias current means comprises a source of voltage and means for connecting the voltage source across the secondary winding.

3. In a frequency meter a saturable core, a primary winding and an auxiliary primary winding connected in series, a rectifier having input and output terminals, a circuit including a secondary winding and an auxiliary secondary winding and an integrating impedance connected across the rectifier input terminals in series, said primary and secondary windings being disposed about the saturable core, said primary and said auxiliary primary windings being similarly wound, said secondary and said auxiliary secondary windings being oppositely wound, bias current means for saturating the core in one direction, means for passing current through the primary winding to saturate the core in a direction opposite to the magnetization by the biasing current, means for interrupting the current flowing through the primary winding to permit the bias current to reverse the saturation of the core, and a galvanometer calibrated as a function of frequency connected across the output terminals of the rectifier.

4. A highly accurate frequency measuring circuit comprising a saturable core of magnetic material, a primary winding and a secondary winding disposed upon said core, flux means for saturating the core in one direction, means for passing current through the primary winding to saturate the core in a direction opposite to the magnetization by said flux means, and meter means calibrated in terms of frequency and connected across said secondary winding to read the average voltage induced thereon.

References Cited in the file of this patent

UNITED STATES PATENTS

| | | |
|---|---|---|
| 671,730 | Mershon | Apr. 9, 1901 |
| 1,541,627 | Coolidge | June 9, 1925 |
| 1,929,259 | Rich | Oct. 3, 1933 |
| 2,058,302 | Faus | Oct. 20, 1936 |
| 2,221,591 | Lansdale | Nov. 12, 1940 |
| 2,228,367 | Sanders | Jan. 14, 1941 |
| 2,249,420 | Engbert | July 15, 1941 |
| 2,380,521 | Haug | July 31, 1945 |